(12) United States Patent
Erwig et al.

(10) Patent No.: US 8,321,780 B2
(45) Date of Patent: Nov. 27, 2012

(54) ADVANCED SPREADSHEET CELL NAVIGATION

(75) Inventors: Martin Erwig, Corvallis, OR (US); Andrew Yip, Corvallis, OR (US); Matthew McLaughlin, Corvallis, OR (US)

(73) Assignee: RedRover Software, Inc., Corvallis, OR (US)

( * ) Notice: Subject to any disclaimer, the term of this patent is extended or adjusted under 35 U.S.C. 154(b) by 1151 days.

(21) Appl. No.: 12/035,222

(22) Filed: Feb. 21, 2008

(65) Prior Publication Data
US 2008/0244377 A1 Oct. 2, 2008

Related U.S. Application Data

(60) Provisional application No. 60/890,972, filed on Feb. 21, 2007.

(51) Int. Cl.
*G06F 17/00* (2006.01)
(52) U.S. Cl. ........................................................ 715/212
(58) Field of Classification Search .................. 715/212, 715/213
See application file for complete search history.

(56) References Cited

U.S. PATENT DOCUMENTS

| | | | | |
|---|---|---|---|---|
| 5,848,187 A * | 12/1998 | Bricklin et al. | ............... | 382/187 |
| 7,231,596 B2 * | 6/2007 | Koren | ........................... | 715/210 |
| 7,299,406 B2 * | 11/2007 | Schnurr | ........................ | 715/212 |
| 7,859,539 B2 * | 12/2010 | Beckman | ...................... | 345/473 |
| 7,913,166 B2 * | 3/2011 | Clark et al. | ..................... | 715/255 |
| 2001/0024212 A1 * | 9/2001 | Ohnishi | ....................... | 345/769 |
| 2004/0205628 A1 * | 10/2004 | Rosenholtz et al. | .......... | 715/526 |
| 2005/0273695 A1 * | 12/2005 | Schnurr | ........................ | 715/503 |
| 2006/0048044 A1 * | 3/2006 | Genesereth et al. | ......... | 715/503 |
| 2006/0064650 A1 * | 3/2006 | Sholl | ............................. | 715/827 |
| 2006/0080594 A1 * | 4/2006 | Chavoustie et al. | ......... | 715/503 |
| 2007/0079230 A1 * | 4/2007 | Vignet | .......................... | 715/504 |
| 2007/0266333 A1 * | 11/2007 | Cossey et al. | ................. | 715/769 |
| 2008/0143670 A1 * | 6/2008 | Vayda | ........................... | 345/156 |
| 2008/0162532 A1 * | 7/2008 | Daga | ............................ | 707/102 |
| 2009/0031206 A1 * | 1/2009 | Aureglia et al. | .............. | 715/217 |
| 2010/0169758 A1 * | 7/2010 | Thomsen | ...................... | 715/212 |

OTHER PUBLICATIONS

Nunnez et al., ViSSh: A Data Visualisation Spreadsheet, Google 2000, pp. 1-10.*
Cunha et al., A Spreadsheet-based Optimization Model for the Integrated Problem of Producing and Distributing a Major Weekly Newsmagazine, Google 2007, pp. 925-940.*

* cited by examiner

*Primary Examiner* — Cong-Lac Huynh
(74) *Attorney, Agent, or Firm* — Perkins Coie LLP

(57) ABSTRACT

A cell navigation system is described that allows easy navigation to cells that are likely to be important to a spreadsheet user. The cell navigation system tracks each cell that a user visits and determines the importance of the cell to the user. The system adds important cells to a navigation list. The cell navigation system presents the list to the user as a tool for navigating to the important cells through a user interface. Thus, the cell navigation system provides the user with a quick and easy way of navigating through a potentially large spreadsheet or workbook of spreadsheets to get to those cells that are most important to the user.

17 Claims, 7 Drawing Sheets

ADVANCED SPREADSHEET CELL NAVIGATION

CROSS-REFERENCE TO RELATED APPLICATIONS

The present application claims the benefit of U.S. Provisional Patent Application No. 60/890,972, entitled "SPREADSHEET CELL NAVIGATOR," and filed on Feb. 21, 2007, which is hereby incorporated by reference.

BACKGROUND

A spreadsheet program is a computer application that displays multiple cells that together make up a grid consisting of rows and columns, called a spreadsheet. Each cell contains either alphanumeric text or numeric values. A cell may alternatively contain a formula that defines how the contents of that cell are to be calculated from the contents of any other cell (or combination of cells) each time any cell is updated. Spreadsheets are frequently used for financial information because of their ability to recalculate the entire sheet automatically after a change to a single cell. In addition, many spreadsheet programs store multiple related spreadsheets together in a single data file, called a workbook.

As the usefulness of spreadsheets has increased, users have demanded ever-larger spreadsheets to hold more and more complex information. For example, based on user demand, Microsoft Excel 2007 increased the number of allowable columns from 256 to 16,384 and the number of allowable rows from 65,536 to 1,048,576 over the previous version. This means that a single worksheet can now have as many as 17 billion cells. In addition, a workbook in Microsoft Excel 2007 may have many spreadsheets within it (limited only by available memory), for a possible total of trillions of cells in a single workbook.

An essential part of everyday work with spreadsheets is moving around within the spreadsheets to edit and inspect cells. These movements are fundamental to working with spreadsheets and occur very frequently, such as when editing data, auditing spreadsheet formulas, or modifying the spreadsheet program. Even most trivial cell formulas contain one or more references to other cells. Understanding the value in a cell often involves navigating to referenced cells and then going back, oftentimes repeatedly.

To navigate to a cell, users have to read the address of the referenced cell and then move to that address themselves by, for example, clicking the mouse. This is an error-prone process. For example, the user could read the address incorrectly or simply click the wrong cell. Worse, when going back to the original cell that contained the reference, the user has to remember the address of that cell and, again, move there manually. In particular, in large spreadsheets, this process can be very tiresome (since it often involves scrolling) and frustrating. Given the enormous size of many modern spreadsheets, users spend a lot of time identifying and navigating to important data to complete daily tasks. In addition, a computer display is often able to show only a few hundred cells at a time to allow the user to read the contents of the cells. Thus, the user may have to scan through many screens of data to find the data that is most relevant to the user. All of this effort distracts the user from the task that the user is concerned with and greatly reduces the efficiency of working with spreadsheets.

DETAILED DESCRIPTION

Overview

A cell navigation system is described that allows easy navigation to cells that are likely to be important to a spreadsheet user. Although a spreadsheet may contain billions of cells, users often visit only a few important cells. For example, the user may enter new data as it is received in a few cells and observe the changes to many calculated cells that are based on the changed cells. In some embodiments, the cell navigation system tracks each cell that a user visits. For example, as the user navigates through a spreadsheet using arrow keys, a tab key, a GoTo box provided by the spreadsheet program, and so forth, the system stores the addresses of the visited cells in a navigation list or stack of visited cells. The cell navigation system may also collect additional data about the visited cells, such as how long the user viewed the cell or kept it selected, what kind of content the cell contains, how the cell is related to other cells, and so on. Based on the additional data, the cell navigation system determines the importance of the cell to the user. If the system determines that a cell is not likely to be important to the user, then the system may remove the cell from (or never add the cell to) the navigation list. The cell navigation system presents the list to the user as a tool for navigating to the important cells (i.e., trace-based navigation) through a variety of user interfaces, each described below. For example, the system may present the navigation list in a forward/back button format similar to a web browser. Thus, the cell navigation system provides the user with a quick and easy way of navigating through a potentially large spreadsheet or workbook of spreadsheets to get to those cells that are most important to the user.

The cell navigation system supports direct jumping to referenced cells in formulas, direct jumping back to previously visited cells (and back again), using a cell map to navigate through the spreadsheet, remembering and defining hot spots of often-used locations, giving direct access to hot spots, and storing jump/navigation information with spreadsheets. Each of these is described in further detail herein.

Suitable System

Figure 1:
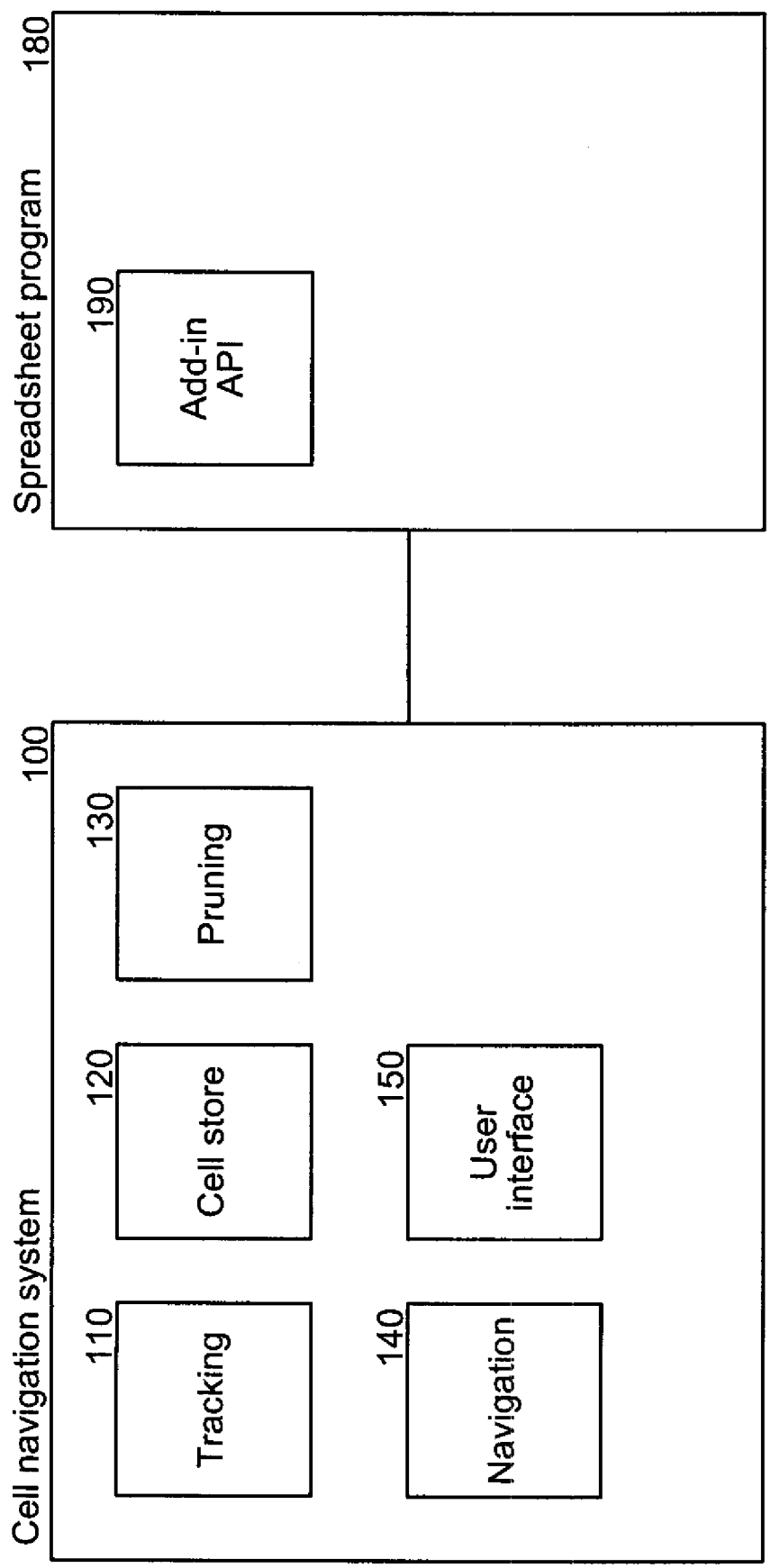
FIG. 1 is a block diagram that illustrates components of a cell navigation system in one embodiment.

FIG. 1 is a block diagram that illustrates components of the cell navigation system in one embodiment. The cell navigation system 100 contains a tracking component 110, a cell store 120, a pruning component 130, a navigation component 140, and a user interface component 150. The cell navigation system interacts with a spreadsheet program 180, which typically has an add-in Application Programming Interface (API) 190. The tracking component 110 tracks the cells that a user visits or selects in a spreadsheet. For example, the user may use a variety of keys and mouse clicks to select various cells in a spreadsheet. The cell store 120 stores the cells that the system 100 determines are important to the user along with any additional useful information about the cells. The cell store 120 may use any suitable format, such as a list, stack, or more complex data structure for storing the cells. The pruning component 130 prunes the list of cells that are tracked to a smaller subset that contains those cells that are likely to be important to the user. The pruning component 130 may determine whether a cell is important based on a variety of factors discussed in further detail herein. The navigation component 140 allows the user to navigate to important cells in the cell store 120. The user interface component 150 provides a graphical display of the cell store 120 that allows the user to identify a cell among the important cells that the user currently wants to view and navigate to the important cell using the navigation component 140.

In some embodiments, the cell store 120 and any information related to the user interface (e.g., the jump map described herein) are stored together with the spreadsheet. For example, the cell store 120 may be stored within the same data file as the spreadsheet. Then, when the user edits the spreadsheet later, the cell navigation system 100 preserves any recently visited cell positions and any user-defined hot spots across editing sessions. Additionally, separate cell information may be stored for each user of the spreadsheet. This allows an administrator or other user to audit which cells a particular user viewed and/or modified.

The spreadsheet program 180 with which the cell navigation system 100 interacts may be any spreadsheet program 180 for which appropriate hooks are available for third-party application code to track user activity. For example, the spreadsheet program 180 can include Microsoft Excel, and the cell navigation system can use Visual Studio Tools for Office (VSTO) along with the Microsoft Excel Object Model to track user activity within and supplement the user interface of Microsoft Excel. For example, the Excel.Application object provides notifications such as SheetSelectionChange (fires when the selected cell changes), SheetActivate (fires when a user selects a different worksheet), WorkbookActivate (fires when a user selects a workbook), and WorkbookBeforeClose (fires when the user closes a workbook) that can be used to receive notifications of events and respond accordingly.

Alternatively, the cell navigation system 100 may be integrated into the source code of an open source spreadsheet program, such as OpenOffice Calc. The cell navigation system 100 may run automatically each time the user starts the spreadsheet program 180, recording the cells as the user visits them. The user interface component 150 may supplement the user interface of the spreadsheet program 180. For example, the user interface component 150 may add a toolbar to the spreadsheet program 180 with one or more buttons for navigating to the cells in the cell store 120. Thus, from the user's point of view the cell navigation system 100 may appear to be integrated with the spreadsheet program 180.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Tracking

In some embodiments, the cell navigation system tracks each cell that a user touches. For example, Microsoft Excel provides an API through which a third-party application or add-in can register to receive events, including cell navigation requests. The cell navigation system registers to receive such events and identifies the cell or cells to which each navigation request refers. The cell navigation system keeps a historical navigation list (e.g., a stack) of cells that the user has visited.

In some embodiments, the cell navigation system captures navigation requests that are not delivered through an event API. For example, Microsoft Excel does not report some types of navigation as events. For example, a user may place a checkmark in a cell containing a checkbox or may place a checkbox in a separate user interface related to the spreadsheet that identifies a cell that the user may later want to revisit. The cell navigation system stores such cells that are relevant to the user in the navigation list.

Pruning

The cell navigation system may remove some entries from the list or avoid storing them there at the outset, referred to here as pruning.

In some embodiments, the cell navigation system removes entries from the list that are identified as having less relevance to the user. For example, when the user repeatedly hits the down arrow and does not pause on a cell, the cell navigation system may determine that the user is simply on his or her way to an important cell and may not store the intermediate cells. After a particular action, such as the user pausing for a period of time (e.g., 10 seconds) or viewing details about the cell, the cell navigation system may determine that the cell is relevant to the user and store the cell in the list.

As an example, when a user opens a spreadsheet the active cell is added to the navigation list. When the user causes another cell to become active, the new cell is added to the navigation list if the new cell is active for a period of time longer than a default "Persistence by Time" (PBT) parameter. The purpose of the PBT parameter is to avoid adding cells to the navigation list that are transient in nature, such as where the user activates them only temporarily on the way to a target cell. An example is where the user uses the keyboard arrow keys to make a cell three cells down from the current cell active. The two cells between the initial cell and the target cell are transient cells if the period of time they are active is less than the PBT parameter. The cell navigation system does not add the two cells to the navigation list but does add the target cell. Another example is where the user accidentally clicks a cell and then quickly clicks the proper cell. The accidental cell is active for a period of time less than the PBT parameter, so the system does not add it to the navigation list.

The PBT parameter may initially be based on user studies. The default may be modified through programming or by adaptive techniques within the program that "learn" the speed of the user. For example, the cell navigation system may determine an average amount of time that a user pauses on cells, and set the PBT parameter to an amount of time longer than the average. This feature allows for those using augmented means of inputting commands into keyboards, such as voice recognition or mechanical user assistance, to take advantage of the cell navigation system.

In some embodiments, the cell navigation system identifies the contents of a cell to determine whether the cell is relevant to the user. For example, empty cells that contain no content are identified as being less relevant to the user and may not be added to the list.

In some embodiments, the cell navigation system receives navigation events through an API provided by the spreadsheet program. The API may provide multiple navigation events for actions that are one logical operation to the user. For example, Microsoft Excel provides two notifications when a user types a cell address into a GoTo dialog box that identifies a cell in a spreadsheet other than the currently active spreadsheet. The first notification indicates a jump between spreadsheets and the second notification indicates navigation to the particular identified cell in the other spreadsheet. In such cases, the cell navigation system may store only the final destination cell rather than the intermediate, transitional information.

In some embodiments, the cell navigation system prunes duplicate cells from the list. It is common for a user to visit the same cells repeatedly. The cell navigation system ignores duplicate navigation requests when a cell is already in the list. When the user directs the system to go backward through the user interface, the system may take the user to the cell visited prior to the duplicate cell or the system may move the existing reference to the cell in the list to the front of the list so that the back button takes the user to the duplicate cell.

In some embodiments, the cell navigation system allows the user to configure the types of navigation events that add cells to the list as well as the depth of the list. For example, the user may be able to specify that context-sensitive jumps (described in further detail herein) are always added to the list, but arrow key navigation is not. In addition, the user may configure the depth of the list. For example, the user may elect to keep only the last 20 cells that are determined to be important.

User Interface

In some embodiments, the cell navigation system presents no visible user interface but responds to a specific action of the user to navigate to cells based on context, called a context-sensitive jump. For example, the cell navigation system may add a shortcut to the spreadsheet program so that when the user holds a control key and clicks on a cell at the same time, the cell navigation system navigates the user to another cell that is relevant to that cell. The other cell may be determined based on a formula contained within the currently selected cell, based on historical data about the order in which the user typically visits cells, and so on. For example, when a user has a cell active, and that cell has a formula, the user has the option to control-click on a cell reference within the formula. This cell becomes the target cell. The system will add the current cell to the navigation list if it is not there already. Then the system will navigate the user to the target cell and add the target cell to the navigation list.

Figure 6:
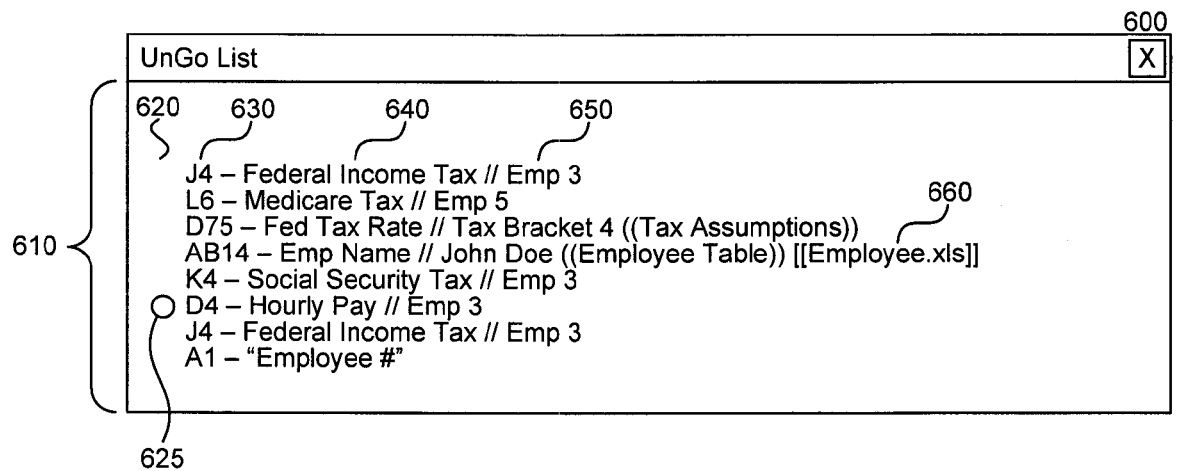
FIG. 6 is a display page that illustrates a list-based user interface for displaying the navigation list in one embodiment.

In some embodiments, the cell navigation system presents the list of cells that a user has visited as forward and back buttons. For example, if the user selects the back button, the cell navigation system changes the current selection in the spreadsheet to a previous cell visited by the user. The cell may be the immediately previous cell the user visited, or based on the pruning described herein, the cell may be another cell that the user previously visited that is identified as having more relevance to the user. The cell may also be a cell from which the user navigated to the current cell using the context-sensitive jump described herein. The forward button allows the user to return to the cell that was selected prior to selecting the back button. Important cells may be stored in a stack or other "last in first out" (LIFO) structure, such that the forward and back buttons move forward and backward in the stack. The user may also be able to right-click on the forward or back button to see a list of possible navigation targets as shown in FIG. 6.

In some embodiments, the cell navigation system presents a jump map user interface that provides a visual map that displays a reduced-size view of the spreadsheet and an indication of the approximate location of each cell in the list of important cells within the spreadsheet. For example, if a spreadsheet that is 100 rows by 100 columns has a list that includes R1C1, R1C100, and R50050, then the jump map would have a disk in the upper left corner to represent R1C1, a disk in the middle to represent R50050, and a disk in the upper right to represent R1C100. The jump map is displayed in a small window and may dynamically update as the user navigates within the spreadsheet. The indication of each cell's location may be a small colored circular icon (e.g., a disk) with a number that indicates the cell's order in the list (and also the order in which the user visited the cell). Alternatively, the cell navigation system may modify the color intensity of the disk to indicate the recency or importance of the cell represented by the disk. The cell navigation system may also modify the size of the disk based on the number of times the user has visited the cell represented by the disk.

In some embodiments, the cell navigation system allows the user to identify hot spots that stay in the list over time. Typically, the system may remove cells from the list over time as the user visits other cells more. Hot spots, on the other hand, identify cells that the user intends to visit repeatedly that should not be removed from the list. Hot spots may appear in the jump map user interface described herein along with other cells and may be visually distinct so that the user can identify them. For example, disks on the jump map representing hot spots may have a special border or color.

Figures

Figure 2:
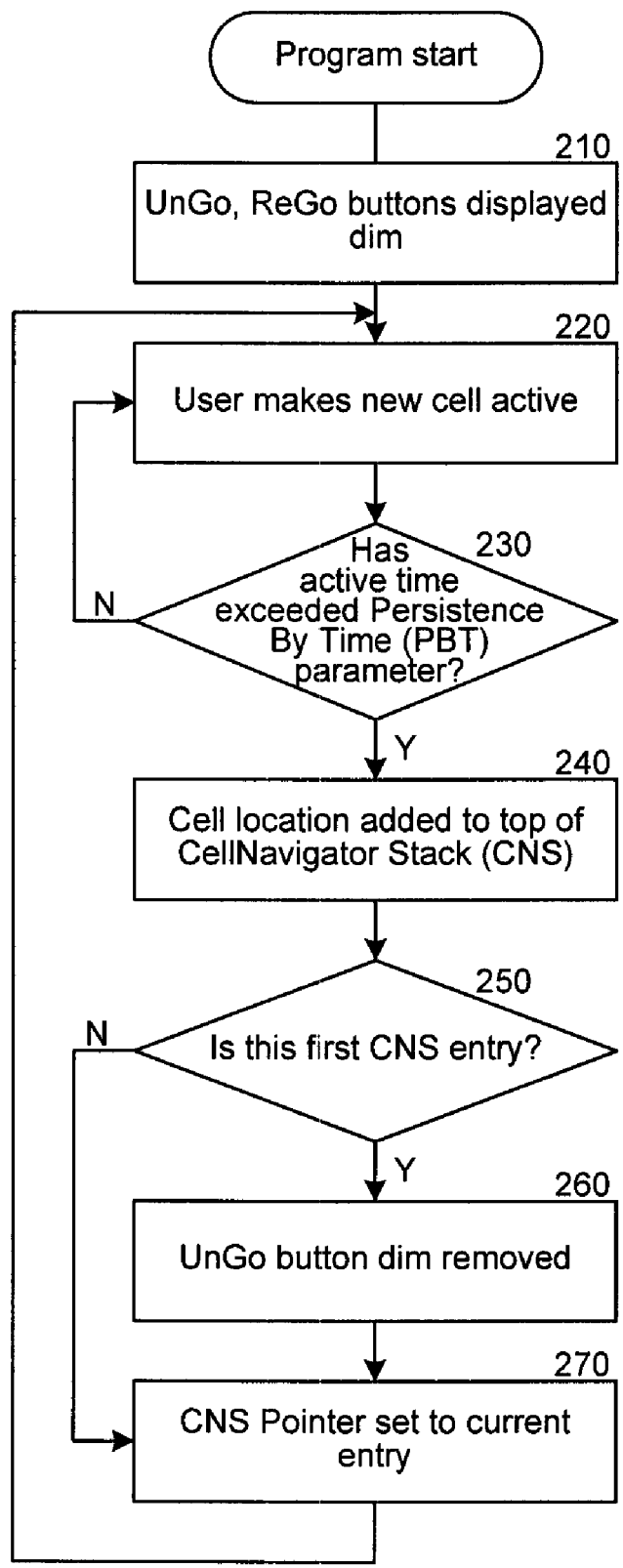
FIG. 2 is a flow diagram that illustrates the interaction of tracking, pruning, navigation, and user interface components of the cell navigation system in one embodiment.

FIG. 2 is a flow diagram that illustrates the interaction of the tracking, pruning, navigation, and user interface components of the cell navigation system in one embodiment. These steps are performed when the program starts and repeat as the user uses the spreadsheet program. Prior to these steps, the system may record initial information, such as the initially selected cell, whether the program was started by opening a workbook, or whether the program was started with a blank workbook. In block 210, system initially displays UnGo and ReGo (e.g., back and forward) buttons as disabled (e.g., by dimming them) when the program starts. If the user has previously used the cell navigation system and a navigation list is available, then the system may not initially disable these buttons. In block 220, the system receives a new cell selection from the spreadsheet program based on a user navigation event. For example, the user may have pressed the arrow key or clicked on a cell, and the tracking component may have received an event through an add-in API of the spreadsheet program.

In decision block 230, if the amount of time a cell has been selected exceeds a PBT parameter, then the system continues at block 240, else the system continues at block 220 to wait for the user to select another cell. The PBT parameter may involve a simple timer with a fixed expiration (e.g., 10 seconds). In block 240, the system adds the cell to the navigation list. In decision block 250, if the cell is the first entry on the navigation list, then the system continues at block 260, else the system continues at block 270. In block 260, the system enables the UnGo button. In block 270, the system sets the new entry in the navigation list as the current entry so that a request to navigate back will return the user to that cell. After block 270, the component loops to block 220 to wait for additional user selections for as long as the spreadsheet program is running.

Figure 3:
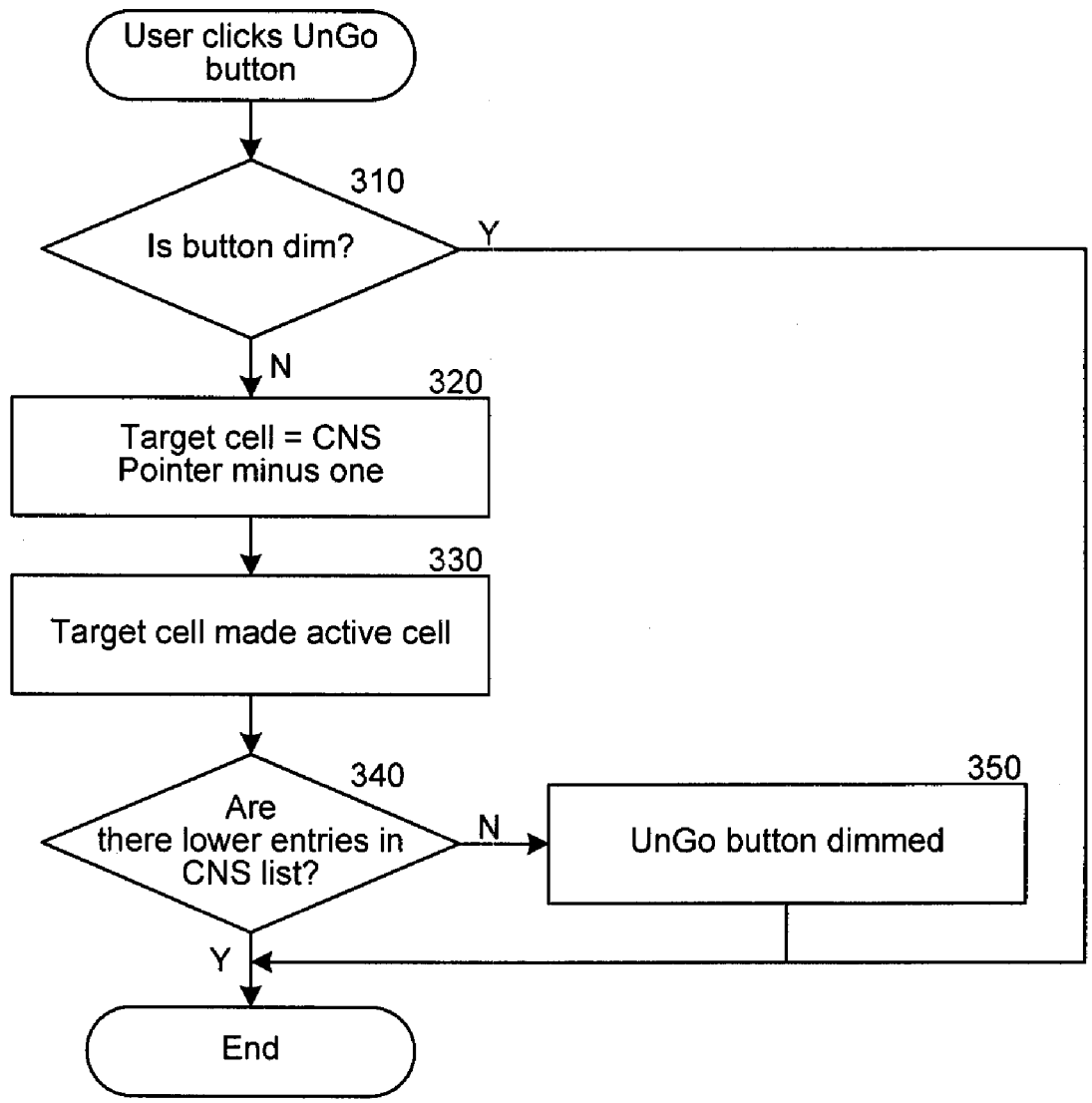
FIG. 3 is a flow diagram that illustrates the processing of the user interface component when a user selects an UnGo (e.g., backward) button in one embodiment.

FIG. 3 is a flow diagram that illustrates the processing of the user interface component when a user selects the UnGo (e.g., backward) button in one embodiment. These steps are invoked when the user clicks the UnGo button in the user interface. In decision block 310, if the button is disabled, then the component completes, else the component continues at block 320. In block 320, the component identifies the target cell as the second most recently added cell on the navigation list (e.g., current pointer minus one since the current pointer generally points to the current cell). In block 330, the component makes the target cell active by navigating the display and a cursor of the spreadsheet program to the target cell. In decision block 340, if there are additional entries lower on the navigation list, then the component completes, else the component continues at block 350. In block 350, the component disables the UnGo button because there are no further entries to go back to. After block 350, the component completes.

Figure 4:
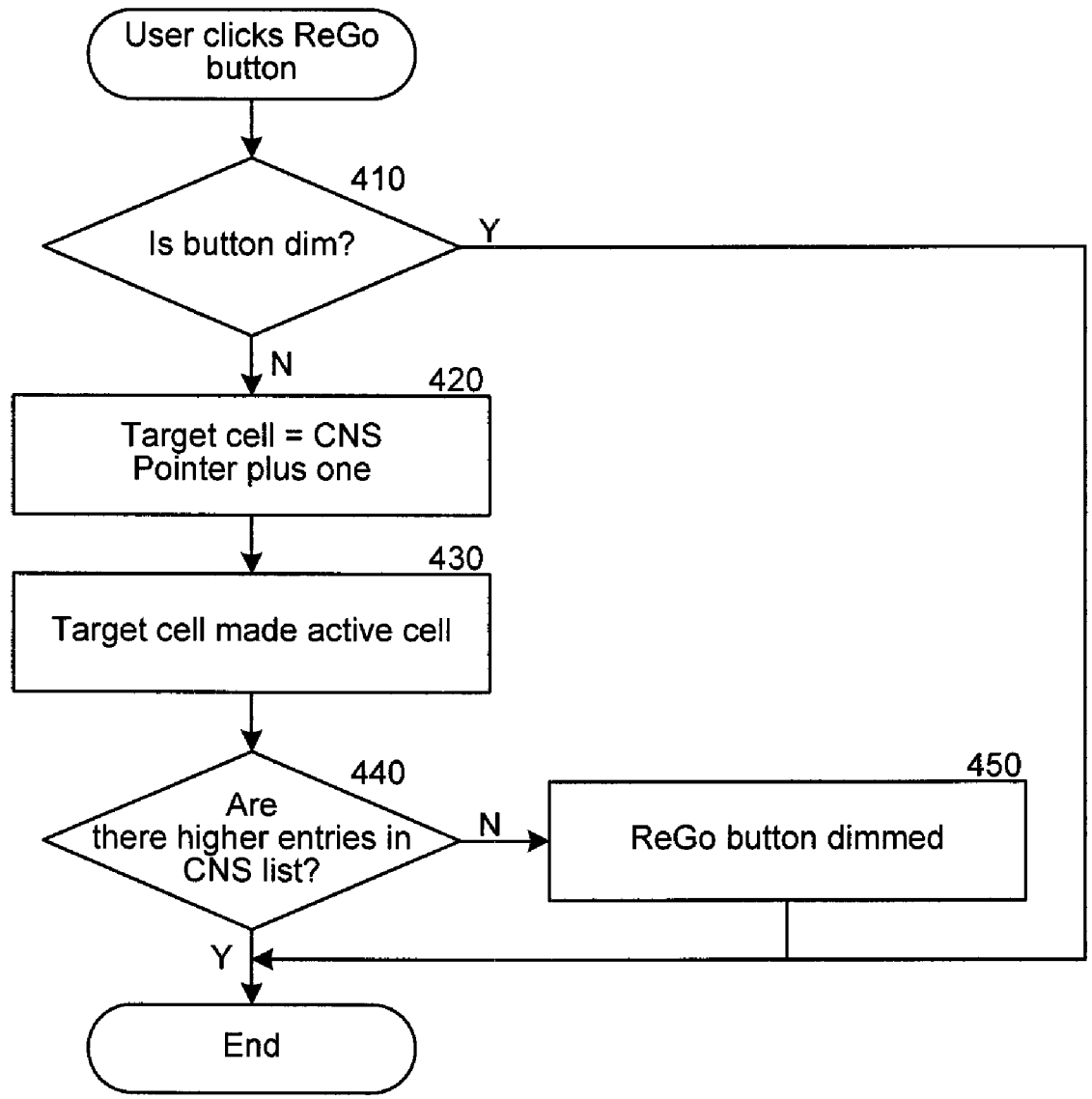
FIG. 4 is a flow diagram that illustrates the processing of the user interface component when a user selects a ReGo (e.g., forward) button in one embodiment.

FIG. 4 is a flow diagram that illustrates the processing of the user interface component when a user selects the ReGo (e.g., forward) button in one embodiment. These steps are invoked when the user clicks the ReGo button in the user interface. In decision block 410, if the button is disabled, then the component completes, else the component continues at block 420. In block 420, the component identifies the target cell as the cell added to the navigation list after the current cell (e.g., current pointer plus one since the current pointer generally points to the current cell). In block 430, the component makes the target cell active by navigating the display and a cursor of the spreadsheet program to the target cell. In decision block 440, if there are additional entries higher on the navigation list, then the component completes, else the component continues at block 450. In block 450, the component disables the ReGo button because there are no further entries to go forward to. After block 450, the component completes.

Figure 5:
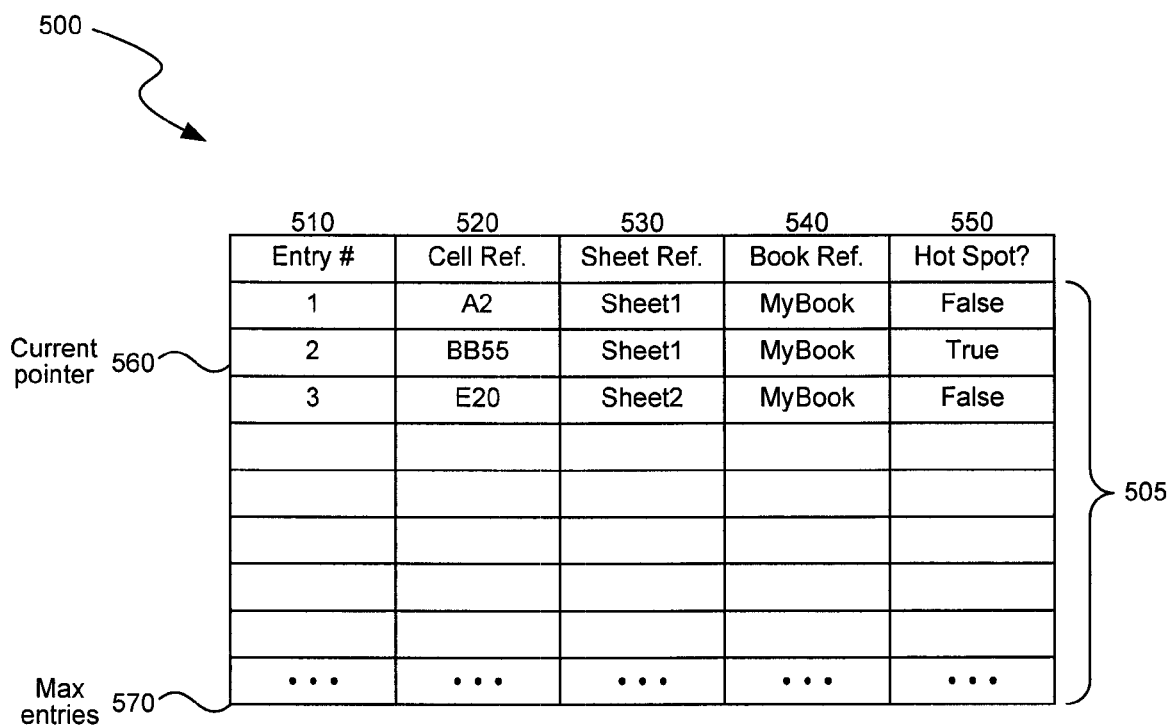
FIG. 5 is a data structure that illustrates the contents of a navigation list in one embodiment.

FIG. 5 is a data structure that illustrates the contents of the navigation list in one embodiment. The data structure 500 contains a list of cell reference entries 505. Each entry has an entry number field 510, a cell reference field 520, a worksheet reference field 530, a workbook reference field 540, and a hot spot flag field 550. The entry number field 510 provides an identifier for the entry for internally distinguishing one entry from another. The cell reference field 520 identifies a particular cell (or range of cells) within a worksheet. The worksheet reference field 530 identifies a particular worksheet within a workbook. For example, the worksheet reference field 530 may identify the worksheet by name. In some embodiments, the cell navigation system may store information about the order of worksheets in a workbook so that if a user renames a worksheet, the cell navigation system can update entries in the navigation list. The workbook reference field 540 identifies a particular workbook, such as by its filename. The hot spot flag field 550 identifies whether the entry represents a hot spot, described further herein. A user may be able to right-click on any cell and identify that cell as a hot spot.

In addition to the list of entries 505, the system stores a current entry pointer 560 and a maximum limit of entries 570. The system uses the current entry pointer 560 to determine which entry to navigate to if the user selects particular elements of the user interface (e.g., the forward or back buttons). The maximum limit of entries 570 determines how deep the navigation list is. If additional entries are added to the list, the system may, for example, remove the oldest entries to make room. The maximum limit of entries 570 may be configurable by the user.

The system may also separate the list into multiple lists. For example, a separate list may be stored for each user that accesses the spreadsheet to allow for auditing or a personalized navigation list for that user.

FIG. 6 is a display page that illustrates a list-based user interface for displaying the navigation list in one embodiment. The display page 600 contains a list of entries 610. The list of entries 610 represents important cells that the user has selected previously. Each entry contains a graphical indicator 620, a cell reference 630, a cell description 640, a worksheet reference 650, and a workbook reference 660. Some information is not displayed for each entry. For example, the workbook reference 660 may not be displayed unless the workbook for that entry is different than the workbook the user is currently viewing. This can help the user distinguish cells near the current selection from cells stored in other worksheets or workbooks.

The cell description 640 displayed for a particular entry may be determined by displaying a limited number of characters (e.g., the first 50 characters) from the contents of the cell. The cell description 640 may also be determined by searching for header information related to a particular cell, such as at the top of a column or left of a row.

The graphical indicator 620 identifies special entries. For example, an indicator 625 identifies a hot spot entry that the user visits frequently and distinguishes it from other entries by using a different color and border.

Figure 7A:
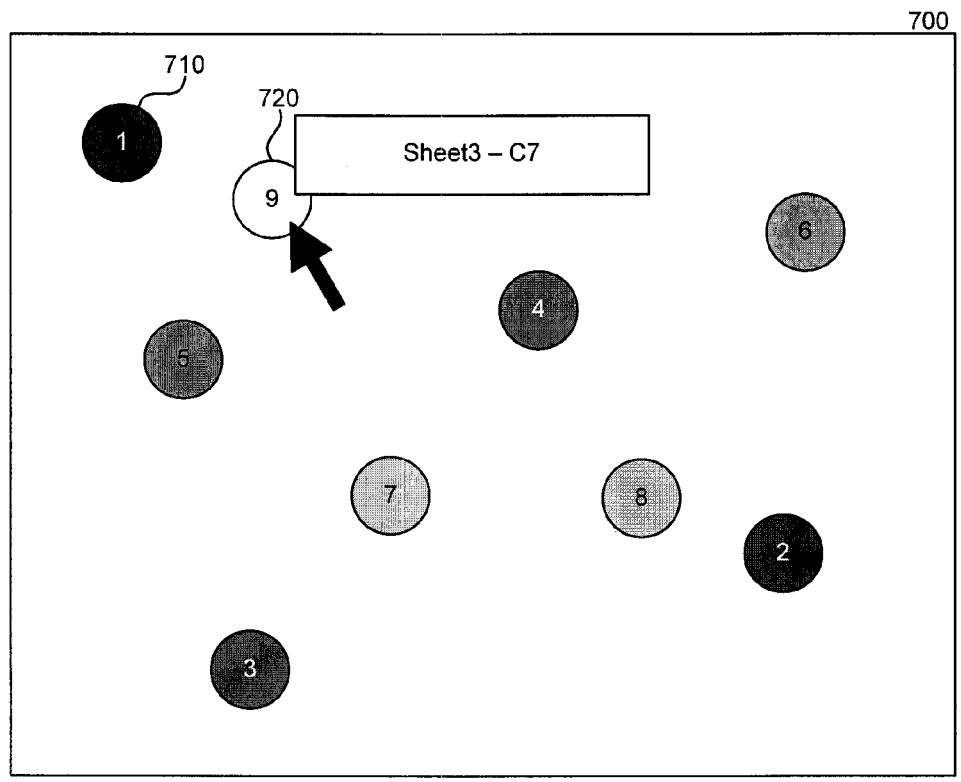
FIGS. 7A and 7B are display pages that illustrate a jump map user interface for displaying the navigation list in one embodiment.
Figure 7B:
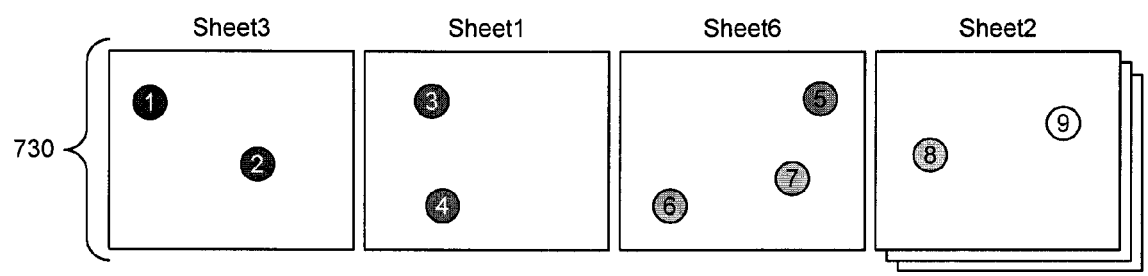

FIGS. 7A and 7B are display pages that illustrate a jump map user interface for displaying the navigation list in one embodiment. The jump map 700 represents a worksheet and contains disks (e.g., 710 and 720) that identify the location of cells within the worksheet. For example, disk 710 represents a cell that is at the upper left of the worksheet, while disk 720 represents a cell that is to the right and below the cell represented by disk 710. This aids a user in finding a particular cell when the user has a rough idea of the location of the cell. The disks are also numbered based on their position in the navigation list. The cell navigation system may also use different disk colors to convey additional information. Disk 720 displays additional details about the cell that it represents when the user hovers over it with the mouse. For example, the user interface may display information such as the sheet name and cell (e.g., "Sheet3-C7") represented by the disk. When the user selects a disk (e.g., by clicking on it with the mouse or tabbing to it and pressing Enter), the system changes the current cell selection to the cell represented by the selected disk. In some embodiments, the user interface of FIG. 7A may represent a collapsed view of multiple worksheets/workbooks. FIG. 7B illustrates another embodiment of a user interface for displaying multiple jump maps, one for each sheet in a workbook. Multiple sheets 730 are each represented by a separate map. In some embodiments, jump maps may also be used to display the cells involved in a formula or other relationships between cells.

CONCLUSION

From the foregoing, it will be appreciated that specific embodiments of the cell navigation system have been described herein for purposes of illustration, but that various modifications may be made without deviating from the spirit and scope of the invention. For example, although spreadsheets have been primarily described, other applications where a user navigates to multiple identifiable locations (e.g., Computer-Aided Drafting (CAD) programs or mapping programs) could also use similar techniques to those described herein. In addition, although single cells are often discussed herein for ease of explanation, the system can also operate on ranges of cells in the same way. For example, the navigation list may contain ranges of cells that are relevant to the user and when the user selects a particular entry from the list, the system may change the selection point to the associated cell range. Accordingly, the invention is not limited except as by the appended claims.

We claim:

1. A computer-readable storage medium encoded with instructions for controlling a computer system to navigate to a cell displayed on a map of a spreadsheet, by a method comprising:
    receiving a list of cell references that identify cells that are relevant to a user;
    displaying a visual map of the spreadsheet that depicts a reduced-size view of the spreadsheet;
    displaying indications on the visual map for each cell reference in the received list, wherein each indication provides the approximate location of one of the cell references within the spreadsheet;
    receiving a selection of one of the indications; and
    changing a current selection in the spreadsheet to the cell reference associated with the selected indication.

2. The computer-readable medium of claim 1 including dynamically updating the displayed visual map as the user navigates within the spreadsheet.

3. The computer-readable medium of claim 1 wherein the visual map is displayed in a small window that allows the spreadsheet to remain visible to the user.

4. The computer-readable medium of claim 1 wherein the indications are numbered according to an order of the cell references within the list.

5. The computer-readable medium of claim 1 wherein the indications have a color intensity based on a determined relevance of the cell reference represented by each indication to the user.

6. The computer-readable medium of claim 1 wherein the size of each indication is based on the number of times the user has visited the cell reference represented by the indication.

7. A computer system for navigating to a cell displayed on a map of a spreadsheet, comprising:
    a computer-readable storage medium storing computer-executable instructions for:
        receiving a list of cell references that identify cells that are relevant to a user;
        displaying a visual map of the spreadsheet that depicts a reduced-size view of the spreadsheet;
        displaying indications on the visual map for each cell reference in the received list, wherein each indication provides the approximate location of one of the cell references within the spreadsheet;
        receiving a selection of one of the indications; and
        changing a current selection in the spreadsheet to the cell reference associated with the selected indication; and
    a processor that executes the computer-executable instructions stored in the memory.

8. The computer system of claim 7 wherein the computer-executable instructions are further for dynamically updating the displayed visual map as the user navigates within the spreadsheet.

9. The computer system of claim 7 wherein the visual map is displayed in a small window that allows the spreadsheet to remain visible to the user.

10. The computer system of claim 7 wherein the indications are numbered according to an order of the cell references within the list.

11. The computer system of claim 7 wherein the indications have a color intensity based on a determined relevance of the cell reference represented by each indication to the user.

12. The computer system of claim 7 wherein the size of each indication is based on the number of times the user has visited the cell reference represented by the indication.

13. A method performed by a computer system for navigating to a cell displayed on a map of a spreadsheet, the method comprising:
    receiving a list of cell references that identify cells that are relevant to a user;
    displaying a visual map of the spreadsheet that depicts a reduced-size view of the spreadsheet;
    displaying indications on the visual map for each cell reference in the received list, wherein each indication provides the approximate location of one of the cell references within the spreadsheet;
    receiving a selection of one of the indications; and
    changing a current selection in the spreadsheet to the cell reference associated with the selected indication.

14. The method of claim 13 including dynamically updating the displayed visual map as the user navigates within the spreadsheet.

15. The method of claim 13 wherein the visual map is displayed in a small window that allows the spreadsheet to remain visible to the user.

16. The method of claim 13 wherein the indications are numbered according to an order of the cell references within the list.

17. The method of claim 13 wherein the indications have a color intensity based on a determined relevance of the cell reference represented by each indication to the user.

* * * * *